United States Patent [19]
Scherzer et al.

[11] Patent Number: 5,885,394
[45] Date of Patent: Mar. 23, 1999

[54] PRODUCTION OF SHEET-LIKE POLYURETHANE MOLDINGS

[75] Inventors: Dietrich Scherzer, Neustadt; Bernd Bruchmann, Freinsheim; Rolf Illguth, Ludwigshafen; Ludwig Jung, Mammendorf, all of Germany

[73] Assignee: BASF Aktiengesellschaft, Ludwigshafen, Germany

[21] Appl. No.: 800,911

[22] Filed: Feb. 13, 1997

[30] Foreign Application Priority Data

Feb. 14, 1996 [DE] Germany ................. 196 05 347.1

[51] Int. Cl.$^6$ ..................................... B29C 41/00
[52] U.S. Cl. ................. 156/242; 264/134; 264/135
[58] Field of Search ................... 264/134, 135; 156/245, 242

[56] References Cited

U.S. PATENT DOCUMENTS

| | | | |
|---|---|---|---|
| 2,959,511 | 11/1960 | Finger | 154/106 |
| 2,978,376 | 4/1961 | Hulse | 154/110 |
| 3,137,750 | 6/1964 | Gringras | 264/257 |
| 3,189,669 | 6/1965 | Goldfein | 264/134 |
| 3,325,338 | 6/1967 | Green | 264/134 |
| 3,446,686 | 5/1969 | Butler et al. | 156/224 |
| 3,636,199 | 1/1972 | Jenks et al. | 264/134 |
| 3,817,806 | 6/1974 | Anderson et al. | 156/161 |
| 3,867,492 | 2/1975 | Drostholm | 264/134 |
| 3,989,781 | 11/1976 | Chant | 264/46.4 |
| 3,993,608 | 11/1976 | Wells | 260/2.5 AW |
| 4,073,997 | 2/1978 | Richards et al. | 428/285 |
| 4,123,488 | 10/1978 | Lawson | 264/135 |
| 4,201,612 | 5/1980 | Figge et al. | 156/224 |
| 4,201,823 | 5/1980 | Russell | 428/246 |
| 4,245,006 | 1/1981 | Shanoski | 264/134 |
| 4,374,229 | 2/1983 | Dunnavant et al. | 525/28 |
| 4,409,270 | 10/1983 | Faber et al. | 264/134 |
| 4,435,349 | 3/1984 | Dominquez et al. | 264/257 |
| 4,732,725 | 3/1988 | Moncheaux et al. | 264/134 |
| 4,755,337 | 7/1988 | Takahashi et al. | 264/134 |
| 4,812,368 | 3/1989 | Scherzer et al. | 264/134 |
| 4,952,358 | 8/1990 | Okina et al. | 264/134 |
| 4,980,108 | 12/1990 | Suzuki et al. | 264/134 |
| 5,627,217 | 5/1997 | Rilling et al. | 521/50 |

FOREIGN PATENT DOCUMENTS

| | | |
|---|---|---|
| 276 465 | 8/1988 | European Pat. Off. . |
| 1567783 | 5/1969 | France . |
| 1587855 | 4/1970 | France . |
| WO 9501219 | 1/1995 | WIPO . |

*Primary Examiner*—Mary Lynn Theisen
*Attorney, Agent, or Firm*—Fernando A. Borrego; James J. Drake

[57] ABSTRACT

In a process for producing sheet-like polyurethane moldings by impregnation of porous sheets with a polyurethane system and subsequent reaction of the polyurethane system in a mold, the porous sheet is first fully impregnated with a polyurethane component, then fully impregnated with the other polyurethane component and the molding is then produced in a heated mold by reaction of the polyurethane components.

6 Claims, No Drawings

PRODUCTION OF SHEET-LIKE POLYURETHANE MOLDINGS

The present invention relates to a process for producing sheet-like polyurethane moldings by impregnation of porous, sheet-like materials with polyurethane systems and subsequent reaction of the polyurethane systems to give polyurethanes.

Sheet-like polyurethane moldings are used particularly for interior linings of motor vehicles. They can be produced by impregnation of porous, sheet-like materials with polyurethane systems and subsequent reaction of these systems to give polyurethanes. As polyurethane systems, it is also possible to use isocyanates, for example in the form of dispersions, or prepolymers containing isocyanate groups which are reacted with water. Atmospheric moisture and/or the moisture present in the porous, sheet-like materials may be sufficient for this purpose. customarily, the porous, sheet-like materials are first introduced into the mold and are there impregnated with the premixed polyurethane system.

Porous, sheet-like materials which can be used here are synthetic foams such as flexible or semirigid polyurethane foams, or fabrics such as fiberglass or fabrics of natural fibers such as felts or mats of plant fibers.

For the purpose of shaping and to accelerate the reaction, the sheets are usually placed in a heated mold after impregnation. In this process step, the moldings can also be provided with laminating materials such as films or mats. This gives moldings having a sandwich structure.

The known processes for producing sheet-like polyurethane moldings have disadvantages. Use of dissolved isocyanates leads to release of solvents. To eliminate this defect, EP-A-276 465 proposes the use of aqueous isocyanate suspensions for impregnating the porous materials. However, this process results in relatively long demolding times, since the vaporization of the water takes a long time.

When using polyurethane systems for producing sheet-like moldings, it is necessary for the systems to have a sufficiently long pot life in order to avoid foaming prior to full impregnation of the porous material. This can be achieved, for example, by reversible blocking of the functional groups of the system components. However, a disadvantage is that the blocking agent set free can remain in the fiber part after the polyurethane formation reaction. In addition, the viscosity of such polyurethane systems is usually very high, which can, particularly when using sheet-like materials based on plant fibers, lead to incomplete impregnation with the polyurethane systems. Flow problems occur during impregnation of the materials in the mold.

It is an object of the present invention to develop a simple and low-cost process for producing sheet-like polyurethane moldings which avoids the disadvantages of the prior art.

We have found that this object is achieved by a process for producing sheet-like polyurethane moldings by impregnation of porous sheets with a polyurethane system and subsequent reaction in a mold, wherein the porous sheet is first fully impregnated with a polyurethane component, the sheet is then fully impregnated with the other polyurethane component and the molding is subsequently produced in a heated mold by reaction of the polyurethane components. The impregnation of the porous sheets can be carried out by means of rollers. Preference is given to using calenders which are provided with heating.

The present invention accordingly provides a process for producing sheet-like polyurethane moldings by impregnation of porous sheets with a polyurethane system and subsequent reaction in a mold, which comprises first fully impregnating the porous sheet with a polyurethane component, then fully impregnating it with the other polyurethane component and subsequently placing it in a heated mold.

The sheet-like polyurethane moldings can be provided with covering layers or linings. This is customarily achieved by placing the linings in the mold prior to the introduction of the impregnated sheets. It is also possible to impregnate the sheet-like, porous body only partially or to introduce an impregnated layer together with unimpregnated layers into the mold.

The following details may be given with regard to the starting materials for the process of the present invention:

Porous sheets which can be used include both synthetic products and natural materials. In the case of the synthetic products, flexible and semirigid foams are of particular importance. To ensure sufficient impregnation, a high content of open cells is necessary. These requirements are fulfilled by, in particular, polyurethane foams.

Fiberglass mats can also be used as porous sheets. These have the advantage that, owing to their low flow resistance, they are particularly easy to impregnate. Fiberglass mats customarily used have a weight per unit area of about 500 $g/m^2$.

Recently, sheets of natural fibers have greatly increased in importance. In particular, mats of plant fibers such as flax, sisal or jute can be advantageously used. When using such products, the process of the present invention is particularly advantageous compared with the processes of the prior art, since these mats have a high flow resistance toward the polyurethane components. This often results, when using polyurethane systems, in the polyurethane system not being able to completely penetrate the mats prior to reaction and the moldings obtained thus having inhomogeneities.

The weights per unit area of such natural fiber mats or recycled fiber mats are usually from 300 $g/m^2$ to 1600 $g/m^2$.

The following details may be given regarding the polyurethane components:

Suitable organic polyisocyanates are the aliphatic, cycloaliphatic, araliphatic and preferably aromatic polyfunctional isocyanates known per se.

Specific examples are: alkylene diisocyanate having from 4 to 12 carbon atoms in the alkylene radical, for example dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (raw MDI) and mixtures of raw MDI and tolylene diisocyanates. The organic diisocyanates and polyisocyanates can be used individually or in the form of their mixtures.

Use is frequently also made of modified polyfunctional isocyanates, i.e. products which are obtained by chemical reaction of organic diisocyanates and/or polyisocyanates. Examples which may be mentioned are diisocyanates and/or polyisocyanates containing ester, urea, biuret, aliophanate, carbodiimide, isocyanurate, uretdione and/or urethane groups. Specific examples are: organic, preferably aromatic polyisocyanates containing urethane groups and having NCO contents of from 33.6 to 15% by weight, preferably from 31 to 21% by weight, based on the total weight, for example diphenylmethane 4,4'-diisocyanate modified with low molecular weight diols, triols, dialkylene glycols, trialkylene glycols or polyoxyalkylene glycols having molecular weights of up to 6000, in particular having molecular weights of up to 1500, modified diphenylmethane 4,4'- and 2,4-diisocyanate mixtures, or modified raw MDI or tolylene 2,4 or 2,6-diisocyanate, where examples of dioxyalkylene or polyoxyalkylene glycols which can be used individually or as mixtures are: diethylene, dipropylene glycol, polyoxyethylene, polyoxypropylene and polyoxypropylene-polyoxyethylene glycols, triols and/or tetrols. Also suitable are prepolymers containing NCO groups and having NCO contents of from 25 to 3.5% by weight, preferably from 21 to 14% by weight, based on the total weight, these being prepared from the polyester and/or preferably polyether polyols described below and diphenylmethane 4,4'-diisocyanate, mixtures of diphenylmethane 2,4'- and 4,4'-diisocyanate, tolylene 2,4- and/or 2,6-diisocyanates or raw MDI. Other polyisocyanates which have been found to be suitable are liquid polyisocyanates containing carbodiimide groups and/or isocyanurate rings and having NCO contents of from 33.6 to 15% by weight, preferably from 31 to 21% by weight, based on the total weight, for example those based on diphenylmethane 4,4'-, 2,4'- and/or 2,2'-diisocyanate and/or tolylene 2,4- and/or 2,6-diisocyanate.

The modified polyisocyanates can, if desired, be mixed with one another or with unmodified organic polyisocyanates such as diphenylmethane 2,4'- and/or 4,4'-diisocyanate, raw MDI, tolylene 2,4- and/or 2,6-diisocyanate.

Organic polyisocyanates which have been found to be particularly useful and are therefore preferably used are: mixtures of tolylene diisocyanates and raw MDI or mixtures of modified organic polyisocyanates containing urethane groups and having an NCO content of from 33.6 to 15% by weight, in particular those based on tolylene diisocyanates, diphenylmethane 4,4'-diisocyanate, diphenylmethane diisocyanate isomer mixtures or raw MDI and, in particular, raw MDI having a diphenylmethane diisocyanate isomer content of from 30 to 80% by weight, preferably from 30 to 55% by weight.

As relatively high molecular weight compounds containing at least two reactive hydrogen atoms, use is advantageously made of those having a functionality of from 2 to 8, preferably from 2 to 6, and a molecular weight of from 500 to 9000. Compounds which have been found to be useful are, for example, polyether polyamines and/or preferably polyols selected from the group consisting of polyether polyols, polyester polyols, polythioether polyols, hydroxyl-containing polyester amides, hydroxyl-containing polyacetals and hydroxyl-containing aliphatic polycarbonates or mixtures of at least two of the polyols specified. Preference is given to using polyester polyols and/or polyether polyols.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decane dicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid derivatives, for example dicarboxylic monoesters and diesters of alcohols having from 1 to 4 carbon atoms or dicarboxylic anhydrides. Preference is given to using dicarboxylic acid mixtures of succinic, glutaric and adipic acid in weight ratios of, for example, 20–35:35–50:20–32, and in particular adipic acid. Examples of dihydric and polyhydric alcohols, in particular alkanediols and dialkylene glycols, are: ethanediol, diethylene glycol, 1,2- or 1,3-propanediol; dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol or mixtures of at least two of the diols specified, in particular mixtures of 1,4-butanediol, 1,5-pentanediol and 1,6-hexanediol. It is also possible to use polyester polyols derived from lactones, e.g. $\epsilon$-caprolactone, or hydroxycarboxylic acids, e.g. $\omega$-hydroxycaproic acid.

To prepare the polyester polyols, the organic, for example aromatic and preferably aliphatic polycarboxylic acids and/or derivatives and polyhydric alcohols can be polycondensed in the absence of catalysts or preferably in the presence of esterification catalysts, advantageously in an atmosphere of inert gas such as nitrogen, carbon monoxide, helium, argon, etc., in the melt at from 150° to 250° C., preferably from 180° to 220° C., under atmospheric or reduced pressure to the desired acid number which is advantageously less than 10, preferably less than 2. According to a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Suitable esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distil off the water of condensation.

To prepare the polyester polyols, the organic polycarboxylic acids and/or derivatives and polyhydric alcohols are advantageously polycondensed in a molar ratio of 1:1–1.8, preferably 1:1.05–1.2.

To produce low-fogging PU moldings, the polyester polyols are, prior to their use, advantageously subjected to a distillation at from 140° to 280° C. under a reduced pressure of from 0.05 to 30 mbar, e.g. a thin-film distillation, to remove volatile constituents.

The polyester polyols obtained preferably have a functionality of from 2 to 4, in particular from 2 to 3, and a molecular weight of from 500 to 3000, preferably from 1200 to 3000 and in particular from 1800 to 2500.

The polyether polyols used are prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one initiator molecule containing from 2 to 8, preferably from 2 to 6, reactive hydrogen atoms in bonded form, or by cationic polymerization using Lewis acids such as antimony pentachloride, boron fluoride etherate, etc., or bleaching earth as catalysts.

Suitable alkylene oxides are, for example, tetrahydrofuran, 1,3-propylene oxide, 1,2- or 2,3-butylene oxide, styrene oxide and preferably ethylene-oxide and 1,2-propylene oxide. The alkylene oxides can be used individually, alternately in succession or as mixtures.

As initiator molecules for the polyether alcohols used, the following compounds are suitable:

Use is made, in particular, of hydroxyl-containing high-functionality compounds, for example castor oil, in particular sugar, starch or lignin, as initiator substances. Glucose, sucrose and sorbitol are of particular practical importance. Since these compounds are present in solid form under the customary reaction conditions of the alkoxylation, it is generally customary to alkoxylate these compounds together with coinitiators. Suitable coinitiators are particularly water and polyhydric lower alcohols, e.g. glycerol, ethylene glycol, propylene glycol and their lower homologues.

In particular, use is made of ammonia, polyfunctional aliphatic amines, in particular those having from 2 to 6 carbon atoms and primary and secondary amino groups, and also aminoalcohols having from 2 to 6 carbon atoms in the main chain.

Preference is given to using ethylenediamine, monoalkylethylenediamine, 1,3-propylenediamine and also various butylenediamines and hexamethylenediamines; and as aminoalcohols ethanolamine, diethanolamine and triethanolamine.

Initiator substances used are water and/or low molecular weight dihydric and/or trihydric alcohols. In particular, use is made of linear or branched alcohols, preferably those having from 2 to 6 carbon atoms in the main chain.

Compounds preferably used as initiator substances are, apart from water, ethylene glycol, propylene glycol, diethylene glycol, dipropylene glycol, 1,4-butanediol, 1,6-hexanediol, glycerol and trimethylolpropane.

Alkylene oxides used are lower alkylene oxides, in particular those having up to 4 carbon atoms. of particular industrial importance are ethylene oxide and 1,2-propylene oxide.

The polyether alcohols used are usually prepared by the anionic reaction mechanism. For this purpose, the initiator substance is first admixed with a basic catalyst. Basic catalysts usually used are alkali metal or alkaline earth metal hydroxides and carbonates, in particular potassium hydroxide.

The molecular addition of the alkylene oxides is usually carried out at, from 80° to 130° C. and pressures of from 0.1 to 1.0 MPa. After the molecular addition of the alkylene oxides, the basic catalyst is neutralized and the polyether alcohol is worked up by removal of the solids, usually by filtration, and removal of the volatile constituents, usually by vacuum distillation in order to keep the thermal stressing of the polyether alcohols low.

The addition of chain extenders, crosslinkers or, if desired, mixtures thereof can be found to be advantageous for modifying the mechanical properties, e.g. the hardness. Chain extenders and/or crosslinkers used are diols and/or triols having molecular weights of less than 400, preferably from 60 to 300. Examples of suitable chain extenders/crosslinkers are aliphatic, cycloaliphatic and/or araliphatic diols having from 2 to 14, preferably from 4 to 10, carbon atoms, e.g. ethylene glycol, 1,3-propanediol, 1,10-decanediol, o-, m- or p-dihydroxycyclohexane, diethylene glycol, dipropylene glycol and preferably 1,4-butanediol, 1,6-hexanediol and bis(2-hydroxyethyl)-hydroquinone, triols such as 1,2,4- or 1,3,5-trihydroxycyclohexane, glycerol and trimethylolpropane and low molecular weight hydroxyl-containing polyalkylene oxides based on ethylene and/or 1,2-propylene oxide and the abovementioned diols and/or triols as initiator molecules.

It is also possible to use hydroxyl-containing natural substances such as castor oil, tall oil and polyols of fatty acids as polyol components.

If chain extenders, crosslinkers or mixtures thereof are used in the preparation of the polyurethanes, these are advantageously used in an amount of from 0 to 20% by weight, preferably from 2 to 8% by weight, based on the weight of the polyol compound.

Blowing agents which can be used for the polyurethane systems employed are the blowing agents customary for producing polyurethane foams, for example halogenated alkanes.

Physical blowing agents which are advantageously used are low-boiling aliphatic hydrocarbons, preferably cyclopentane, n-pentane and/or iso-pentane, in particular n-pentane.

Since the aliphatic hydrocarbons suitable as blowing agents are flammable and explosive, the plants have to be fitted with the appropriate safety facilities.

It is advantageous to use the aliphatic hydrocarbons together with water as blowing agent. The amount of aliphatic hydrocarbons used is from 2 to 25% by weight, preferably from 10 to 13% by weight, based on the polyol component. The proportion of water depends on the desired properties of the polyurethane.

Catalysts used for preparing the polyurethanes are, in particular, compounds which strongly accelerate the reaction of the compounds containing reactive hydrogen atoms, in particular hydroxyl groups, and if desired with the organic, unmodified or modified polyisocyanates. Suitable catalysts are organic metal compounds, preferably organic tin compounds such as tin(II) salts of organic carboxylic acids, e.g. tin(II) acetate, tin(II) octoate, tin(II) ethylhexanoate and tin(II) laurate, and the dialkyl tin(IV) salts of organic carboxylic acids, e.g. dibutyltin diacetate, dibutyltin dilaurate, dibutyltin maleate and dioctyltin diacetate. The organic metal compounds are used alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, bis(dimethylaminomethyl) ether, bis(dimethylaminopropyl) urea, dimethylpiperazine, 1,2-dimethylimidazole, 1-azabicyclo[3.3.0]octane and preferably 1,4-diazabicyclo[2.2.2]octane, and alkanolamine compounds such as triethanolamine, triisopropanolamine, N-methyldiethanolamine, N-ethyldithanolamine and dimethylethanolamine.

The basic amines are used alone or in combination with metal salts or other catalytically active compounds. The basic amines are also frequently blocked by addition of an acid component to delay the start of the PU reaction.

Other suitable catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide and alkali metal alkoxides such as sodium methoxide and potassium isopropoxide, and also alkali metal salts of long-chain fatty acids having from 10 to 20 carbon atoms and possibly lateral OH groups. Preference is given to using from 0.001 to 5% by weight, in particular from 0.05 to 2% by weight, of catalyst or catalyst combination, based on the weight of the polyol component.

If desired, auxiliaries and/or additives can also be incorporated into the polyurethane system. Examples which may be mentioned are surface-active substances, foam stabilizers, cell regulators, fillers, dyes, pigments, flame retardants, hydrolysis inhibitors, fungistatic and bacteriostatic substances.

Suitable surface-active substances are, for example, compounds which serve to aid the homogenization of the starting materials and may also be suitable for regulating the cell structure of the plastics. Examples which may be mentioned are emulsifiers such as the sodium salts of castor oil sulfates or of fatty acids and also amine salts of fatty acids, e.g. diethylamine oleate, diethanolamine stearate, diethanolamine ricinoleate, salts of sulfonic acids, e.g. alkali metal or ammonium salts of dodecylbenzene- or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil or ricinoleic esters, Turkey red oil and peanut oil, and cell regulators such as paraffins, fatty alcohols and dimethylpolysiloxanes. Also suitable for improving the emulsifying action, the cell structure and/or stabilizing the foam are the abovedescribed oligomeric acrylates having polyoxyalkylene and fluoroalkane radicals as side groups. The surface-active substances are usually employed in amounts of from 0.01 to 5 parts by weight, based on 100 parts by weight of the component (b).

Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl)ethylene diphosphate, dimethyl methanephosphonate, diethyl diethanolaminomethylphosphonate and also commercial halogen-containing flame retardant polyols.

Apart from the halogen-substituted phosphates mentioned above, it is also possible to use inorganic or organic flame retardants such as red phosphorus, aluminum oxide hydrate, antimony trioxide, arsenic oxide, ammonium polyphosphate and calcium sulfate, expanded graphite or cyanuric acid derivatives such as melamine, or mixtures of at least two flame retardants such as ammonium polyphosphates and melamine and also, if desired, maize starch or ammonium polyphosphate, melamine and expanded graphite and/or aromatic or aliphatic polyesters for making the polyisocyanate polyaddition products flame resistant. In general, it has been found to be advantageous to use from 5 to 50 parts by weight, preferably from 5 to 25 parts by weight, of the specified flame retardants per 100 parts by weight of the component (b).

However, in the polyurethanes used according to the present invention, no addition of flame retardants, physical blowing agents, catalysts and other auxiliaries is usually made.

Further details regarding the abovementioned other customary auxiliaries and additives may be found in the specialist literature, for example the monograph by J. H. Saunders and K. C. Frisch "High Polymers", volume XVI, Polyurethanes, Parts 1 and 2, Interscience Publishers, 1962 and 1964, or the Kunststoff-Handbuch, Polyurethane, volume VII, Hanser-Verlag, Munich, Vienna, 3rd Edition, 1993.

To carry out the process of the present invention, it is advantageous to impregnate the porous sheet first with the polyol component and then with the isocyanate component of the polyurethane system. This avoids premature reaction of the isocyanate component with any moisture present in the mat and, on the other hand, the isocyanate component, owing to its low viscosity, penetrates the previously impregnated mat more easily than would be the case if the order were reversed.

The impregnation can be carried out either manually, for example using brushes or hand rollers, or mechanically, for example by spraying on or using calenders.

It is particularly advantageous to employ the foams or mats in roll form and to carry out impregnation continuously with the aid of dual roller beds, first with the polyol component and then with the isocyanate component. After impregnation, the mat is cut to length and inserted into the heated mold.

After impregnation, the sheets are placed in heatable molds where the polyurethane reaction occurs. The temperature in the molds is 80°–150° C., preferably 90°–135° C. The porous sheet can be cut to shape for molding either before or after impregnation. To obtain better demolding, mold release agents are used. It is possible either to use internal release agents or to spray the mold with release agent before introducing the sheet.

It is also possible, and for many applications customary, to laminate linings onto the sheet-like polyurethane moldings. Linings used are, for example, open- and closed-cell foams, fiber mats, fabrics, plastic films and similar materials. The linings can be applied to one side or both sides of the sheet-like polyurethane moldings. The lining is usually applied by first placing the lining material and then the impregnated sheet-like material in the mold and then heating to form the polyurethane. This results in bonding of the lining material and the formation of a sandwich structure. It may here be possible, particularly when using films as lining material, to omit the use of mold release agents.

The sheet-like moldings produced by the process of the present invention have a homogeneous structure, good strengths and a uniform surface. Surprisingly, no foaming of the polyurethane system occurred prior to molding. When using lining material, strong bonding of the outer layers occurs.

The following examples illustrate the invention:

EXAMPLE 1

Comparison

A mat of flax/sisal 1:1 having a weight per unit area of 1000 g/m$^2$, which had been impregnated with 300 g of an aqueous suspension of raw MDI having an NCO content of 15%, was laid in a heated test plate mold having dimensions of 500×200×4 mm. The mold was then heated to 110° C. After 15 minutes, the major part of the water had evaporated. After a further 5 minutes, the mold could be opened and the molding taken out.

EXAMPLE 2

Comparison

The procedure of Example 1 was repeated, except that a fiberglass mat having a weight per unit area of 450 g/m$^2$ was laid on the bottom of the mold. Here too, the major part of the water had evaporated only after 15 minutes, and after a further 5 minutes the molding could be taken out.

EXAMPLE 3

Comparison

A mat of flax/sisal 1:1 having a weight per unit area of 1000 g/m² was laid in the mold described in Example 1, heated to 40° C. 150 g of a premixed semirigid polyurethane foam system consisting of 75 g of a sucrose-based polyether alcohol having a hydroxyl number of 403 mg KOH/g (Lupranol® 3321) and 75 g of a raw MDI having an NCO content of 31% by weight (Lupranat® M20W), and having a density of the polyurethane of 300 g/l, a cream time of 25 seconds and a rise time of 100 seconds were poured onto the mat and the mold was closed. The polyurethane foam system was not distributed over the entire mold.

EXAMPLE 4

The flax/sisal mat described in the comparative examples was impregnated by means of a hand roller with 75 g of a sucrose-based polyetherol having a hydroxyl number of 403 mg KOH/g (Lupranol® 3321 from BASF AG). The mat was then likewise impregnated with 75 g of raw MDI (Lupranat® M20W) having an NCO content of 31% by weight and was subsequently introduced into the mold described in the comparative examples, heated to 100° C. After 4 minutes, the system foamed. After 10 minutes, the molding could be taken out. The molding had a high strength and a very smooth surface, a flexural elastic modulus of 1275 N/mm² and a density of 740 g/l.

EXAMPLE 5

The procedure of Example 4 was repeated, except that a mixture of 43 g of a ring-opened epoxidized vegetable-oil polyol having a hydroxyl number of 250 mg of KOH/g, 29 g of castor oil and 27 g of a glycerol-based polyetherol having a hydroxyl number of 550 mg of KOH/g was used in place of the polyetherol. Here too, the molding had a high strength, a very smooth surface, a flexural elastic modulus of 1507 N/mm² and a density of 740 g/l.

EXAMPLE 6

The procedure of Example 4 was repeated, except that a PVC film was laid in the lid of the mold and a fiberglass mat having a weight per unit area of 450 g/m² was laid into the bottom of the mold. The sandwich element obtained had a very good strength. The two outer covering layers were strongly bonded on.

EXAMPLE 7

The procedure of Example 6 was repeated, except that, prior to the introduction into the mold, the fiberglass mat was laid under the impregnated mat and the PVC film was laid on the impregnated mat and the sandwich part thus obtained was introduced into the mold. The sandwich element obtained had a very good strength. The two outer layers were strongly bonded on.

EXAMPLE 8

A flax mat having a weight per unit area of 450 g/m² was, as described in Example 4, impregnated first with 180 g of castor oil and then with 75 g of raw MDI Lupranat® M20W. Sisal mats were then laid both on and under the impregnated mat and the result was introduced into the described mold heated to 100° C. There, the polyurethane system in the flax mat foamed after 4 minutes and penetrated right through the sisal mats. After 10 minutes, the part was removed from the mold. The mold had a good strength, a very smooth surface, a flexural elastic modulus of 1275 N/mm² and a density of 721 g/l.

We claim:

1. A process for producing sheet-like polyurethane moldings, said method comprising the steps of:

A) providing a sheet of porous material, the material comprising natural fibers;

B) impregnating said sheet with an isocyanate-reactive component comprising a relatively high molecular weight compound containing at least two reactive hydrogen atoms and having a molecular weight of from 500 to 9000;

C) impregnating said sheet with an organic isocyanate component; and

D) reacting said isocyanate-reactive component and said organic isocyanate component in a mold to produce a sheet-like polyurethane molding.

2. The process as recited in claim 1, wherein said sheet of porous material is selected from the group consisting of flax mats, sisal mats and jute mats.

3. The process as recited in claim 1, wherein said organic polyisocyanate component is selected from the group consisting of diphenylmethane diisocyanates, tolylene diisocyanates, raw MDI and mixtures thereof.

4. The process as recited in claim 1, wherein said compound containing at least two reactive hydrogen atoms is selected from the group consisting of polyether polyamines, polyether polyols, polyester polyols, polythioether polyols, hydroxyl-containing polyester amides, hydroxyl-containing polyacetyls, hydroxyl-containing aliphatic polycarbonates and mixtures thereof.

5. The process as recited in claim 1, wherein said isocyanate-reactive component further comprises a compound selected from the group consisting of chain extender, a crosslinker, a blowing agent, a catalyst, a surface-active substance, foam stabilizer, cell regulator, filler, dye, pigment, flame retardant, hydrolysis inhibitor, fungistatic or bacteriostatic substances or mixture thereof.

6. The process as recited in claim 1, wherein said process further comprises laminating a lining onto the polyurethane molding.

* * * * *